(12) United States Patent
Zenda (10) Patent No.: US 10,021,829 B2
(45) Date of Patent: Jul. 17, 2018

(54) RAKE STAND

(71) Applicant: Cargazen, Inc., Wilkes-Barre, PA (US)

(72) Inventor: Richard J. Zenda, Plains, PA (US)

(73) Assignee: Cargazen, Inc., Wilkes-Barre, PA (US)

( * ) Notice: Subject to any disclaimer, the term of this patent is extended or adjusted under 35 U.S.C. 154(b) by 134 days.

(21) Appl. No.: 15/260,667

(22) Filed: Sep. 9, 2016

(65) Prior Publication Data

US 2017/0089510 A1   Mar. 30, 2017

Related U.S. Application Data

(60) Provisional application No. 62/234,288, filed on Sep. 29, 2015.

(51) Int. Cl.
*F16M 11/00* (2006.01)
*A01D 7/00* (2006.01)

(52) U.S. Cl.
CPC ...................................... *A01D 7/00* (2013.01)

(58) Field of Classification Search
CPC .......... F16M 13/00; B25B 11/00; A01D 11/00
See application file for complete search history.

(56) References Cited

U.S. PATENT DOCUMENTS

| | | | |
|---|---|---|---|
| 2,268,066 A | 12/1941 | Brooke | |
| 5,065,475 A * | 11/1991 | Watt | A01B 1/22 15/145 |
| 2008/0060338 A1 | 3/2008 | Chang | |
| 2008/0093318 A1 * | 4/2008 | Hansen | B25H 3/006 211/70.6 |
| 2012/0102908 A1 | 5/2012 | Gayewski | |
| 2013/0291695 A1 * | 11/2013 | Bricker | B25B 11/00 81/489 |

* cited by examiner

*Primary Examiner* — Amy Jo Sterling
(74) *Attorney, Agent, or Firm* — Zale Patent Law, Inc.; Lawrence P. Zale (57) ABSTRACT

A simple, compact stand is designed to attach to various types of hand implements with an elongated handle, such as a rake, that employs a leg that folds down to support the hand implement in an upright position. The leg folds upright out of the way when the rake is being used. The leg includes a foot with two extending protrusion on either side of the foot, which provide stability on surfaces that are not flat, as well as flat surfaces.

7 Claims, 8 Drawing Sheets

RAKE STAND

CROSS REFERENCE TO RELATED APPLICATIONS

This application claims the benefit of U.S. Provisional Patent Application 62/234,288 filed Sep. 29, 2015 "Rake Stand", by Richard J. Zenda that is incorporated by reference as if set forth in its entirety herein.

BACKGROUND OF THE INVENTION

1. Field of the Invention

The present invention relates to a novel device for holding a rake upright, and more specifically for a compact, simple, and novel device for holding a rake upright.

2. Discussion of Related Art

When using a hand implement with a long handle, such as a rake, if the user has to stop using the rake and do some other task, (s)he may put the rake down until (s)he resumes raking again. This requires the user to bend down to pick up the rake. As the user gets older, bending over to pick up objects off of the ground becomes more difficult.

Also, as the user gets older, there is a greater chance that the user will acquire arthritis causing back pain when the user bends over.

When the user has to repeatedly pick up the rake from the ground, the user will become tired and possibly experience back pain. Therefore, even the easiest job, such as raking leaves can become tiresome if the user has to repeatedly pick up the rake from the ground.

U.S. Pat. No. 2,268,066 issued Sep. 19, 1940 shows a rake with an extension of handle 31 referred to as 'a cutter 40'. This handle extension and cutter 40 is always extended and protrudes past the length of the spring tines 10 of the rake. The rake is leaned away from the user toward the back side of the rake and rests upon cutter 40 and is used to stand the rake up when it is not in use. Since the handle extension and cutter 40 are always extended and cannot be folded away, they can cause problems, especially when the rake is being used in tight places, such as between bushes.

Another structure employed a rake with a wide folding stand. Again, this was bulky and causes problems when used in tight places.

All of the above devices were built into the device and could not be removed and transferred to other devices.

Currently, there is a need for a simple, compact, stand designed to be attached to various types of hand implements that is capable of holding the hand implement upright when not in use.

BRIEF DESCRIPTION OF THE DRAWINGS

The advantages of the instant disclosure will become more apparent when read with the specification and the drawings, wherein.

DETAILED DESCRIPTION OF THE INVENTION

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and will fully convey the concept of the invention to those skilled in the art. The claims should be consulted to ascertain the true scope of the invention.

Overall

One goal of the present invention is to provide a simple, compact device for attaching to and holding a hand implement in an upright position when it is not in use.

Figure 1A:
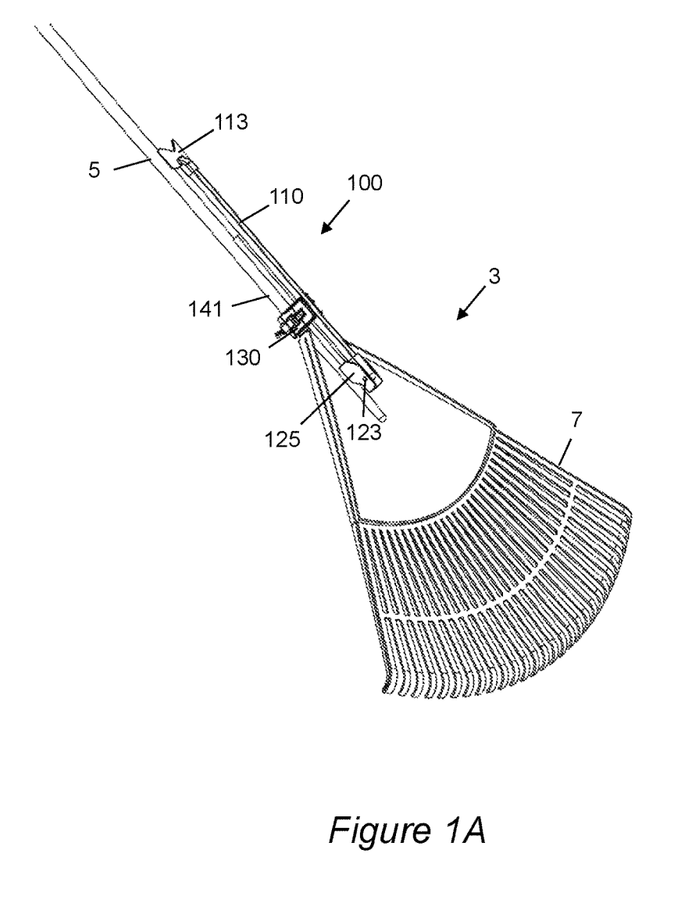
FIG. 1A is a perspective view of a leaf rake having one embodiment of a stand device according to the present invention in its stored position, attached to the back side of the leaf rake.

FIG. 1A is a perspective view of a hand implement 3 (being a leaf rake here) having one embodiment of a stand device 100 according to the present invention in its stored position, attached to the back side of the leaf rake 3.

Figure 1B:
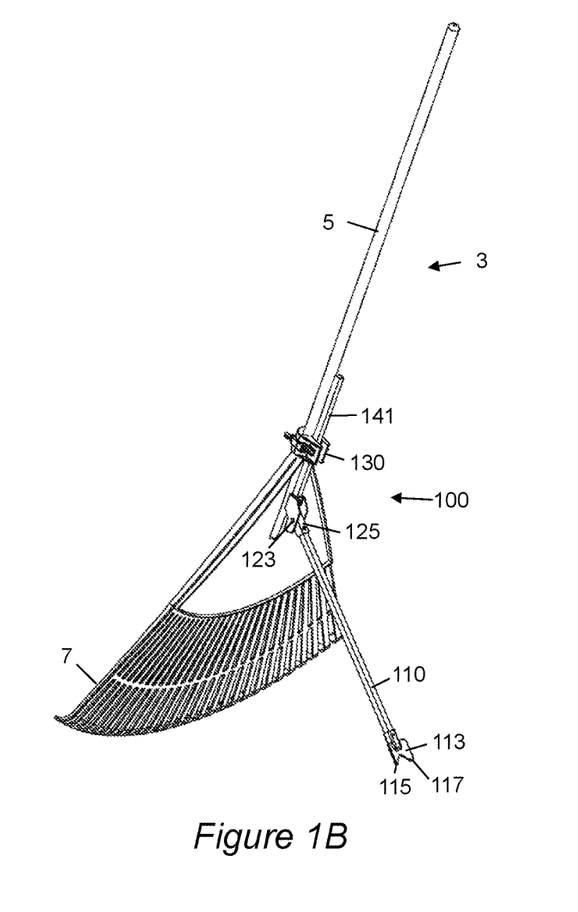
FIG. 1B shows a perspective view of the stand device and leaf rake of FIG. 1A in its use position standing upright.

FIG. 1B shows a perspective view of the stand device 100 and leaf rake of FIG. 1A in its use position standing upright.

The novel stand device will now be described in connection with FIGS. 1A and 1B. The side which is downward when the rake is being used will be referred to as the front side and the other side will be referred to as the back side. In this view, a leg 110 is shown folded up in a storage position adjacent to and substantially parallel to the handle 5.

The leg 110 is intended to pivot about a pin 123 to rotate downward toward a number of rake tines 7 at a lower portion of the rake 3. The end of stand device 100 which has the pin 123 is referred to as the pivot end 120.

Figure 2:
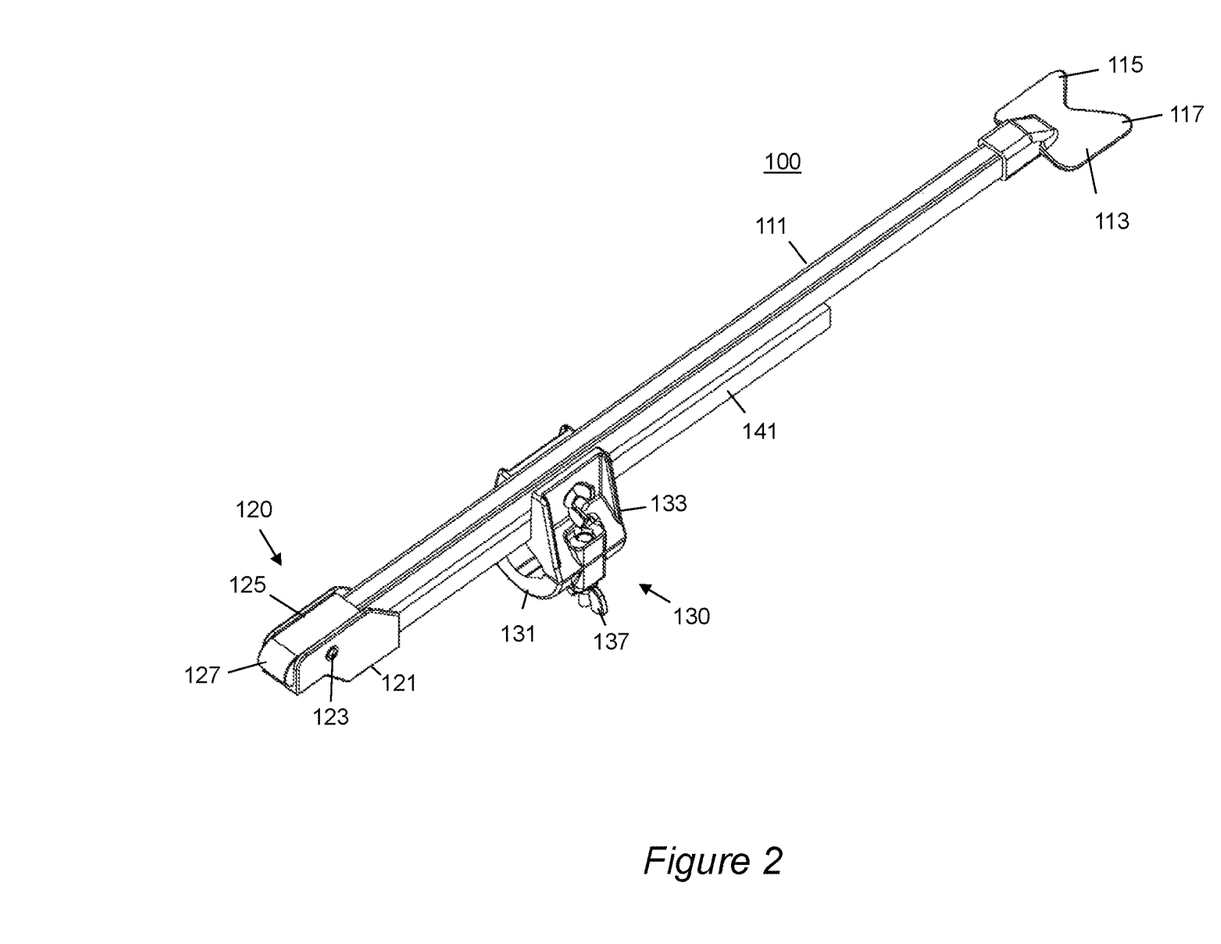
FIG. 2 is a perspective view of one embodiment of the stand as it would appear as viewed from above.

FIG. 2 is a perspective view of one embodiment of the stand device 100 as it would appear as viewed from above. Here a leg bar 111 has a foot 113 which preferably has two protrusions 115 and 117 on either side of foot 113. These help in limiting rocking on convex surfaces. A flat foot would have a point of contact with a convex surface and allow side to side rocking.

A clamp 130 attaches to the handle 5 of a hand implement 3, steadying and securing the stand 100. In this embodiment, the clamp 130 has a clamp body 133 and a clamp cap 131. These are held together by a first fastener 135 connected to a second fastener 137. These fasteners may be conventional fastening means such as a screw and a wingnut, respectively. The clamp 130 is secured to an elongated handle support which is held against the handle 5 of the hand implement 3.

Figure 3:
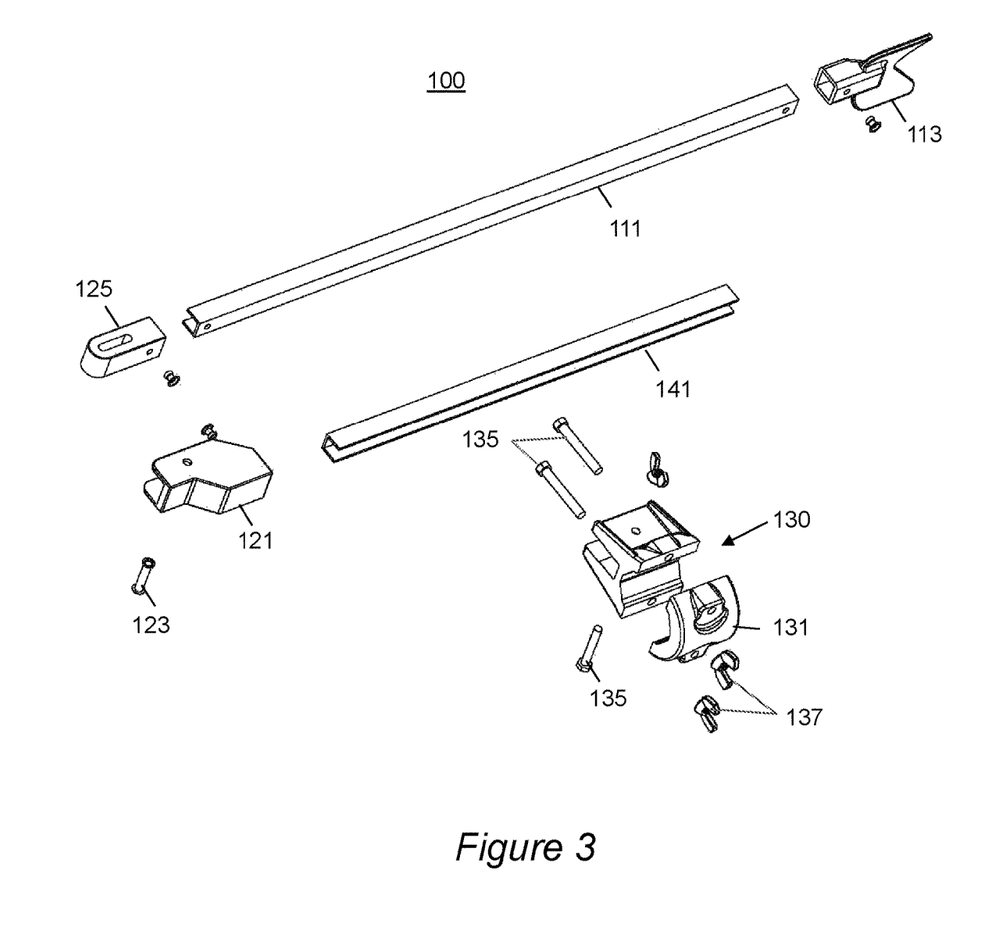
FIG. 3 is an exploded view of the embodiment shown in FIG. 2.

FIG. 3 is an exploded view of the embodiment shown in FIG. 2. The structure of endpiece 125 can be more easily seen in this figure. The parts of the clamp 130 can also be seen here.

Figure 4:
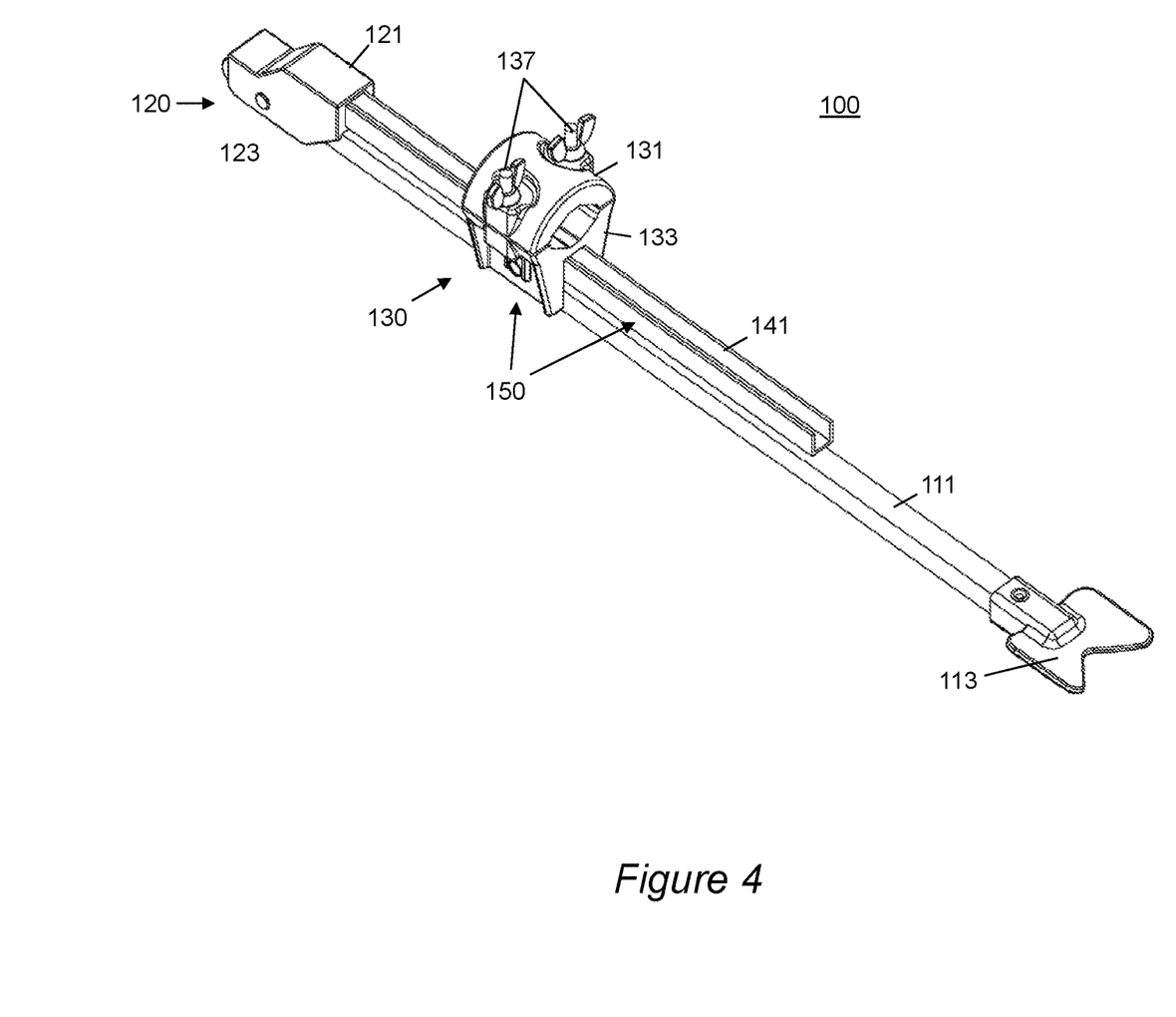
FIG. 4 is a perspective view of one embodiment of the present invention as it would appear as viewed from below.

FIG. 4 is a perspective view of one embodiment of the present invention as it would appear as viewed from below. In this view, the endpiece 125, housing 121, clamp body 133, leg bar 111 and foot 113 are clearly visible. The clamp 130 and handle support 141 may be collectively referred to as a securing structure 150.

Figure 5:
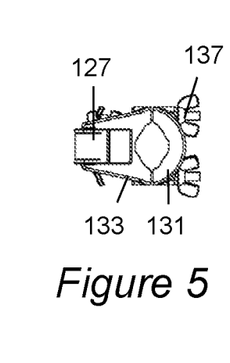
FIG. 5 is a plan view of the embodiment of FIGS. 1-11 as viewed from below.

FIG. 5 is an end-on view of the embodiment of FIGS. 1-11 as viewed from the pivot end 120. In this view, the curved end 127 of the endpiece is easily seen. Also the second part of the fastener 137, implemented here as a wingnut is visible.

Figure 6:
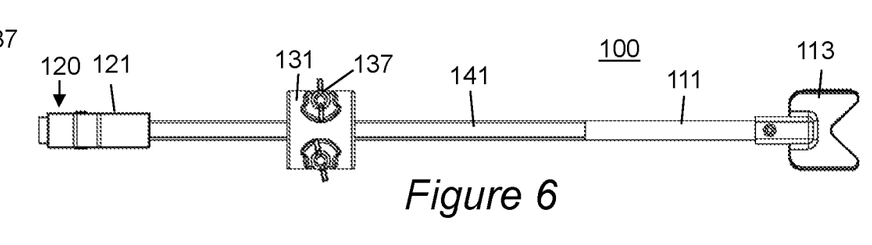
FIG. 6 is a plan view of the embodiment of FIGS. 1-11 as viewed from below.

FIG. 6 is a plan view of the embodiment of FIGS. 1-11 as viewed from below. Here the handle support 141 which is attached to the handle (5 of FIGS. 1A, 1B) of the hand implement 3.

Figure 7:
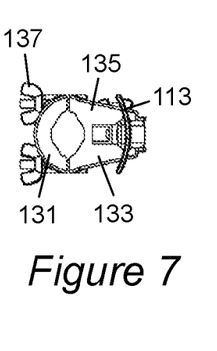
FIG. 7 is an end-on view of the embodiment of FIGS. 1-11 as viewed from the foot.

FIG. 7 is an end-on view of the embodiment of FIGS. 1-11 as viewed from the foot 113.

Figure 8:
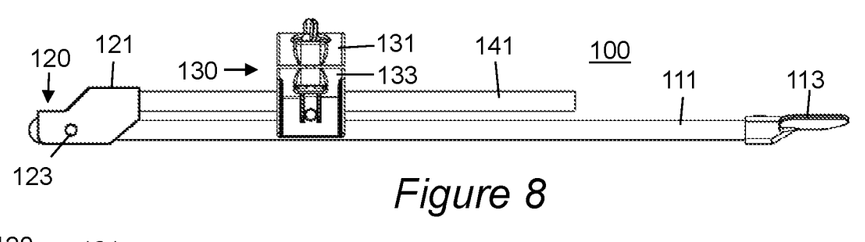
FIG. 8 is a side elevational view of one embodiment of the stand device.

FIG. 8 is a side devotional view of one embodiment of the stand device 100. Here the clamp 130 is shown as a top portion 131 connected to a body portion 133 designed to clamp around a handle of a hand implement.

Figure 9:
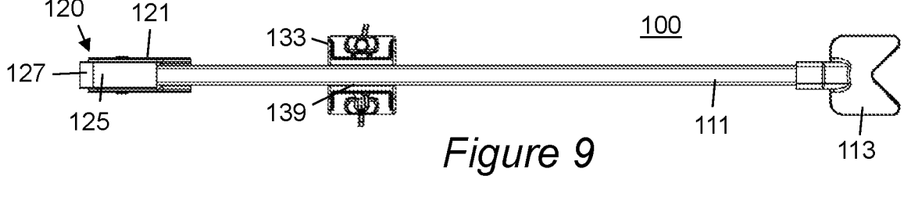
FIG. 9 is a plan view of the embodiment of FIGS. 1-11 as viewed from above.

FIG. 9 is a plan view of the embodiment of FIGS. 1-11 as viewed from above. This shows the opposite side of the stand device 100.

Figure 10:
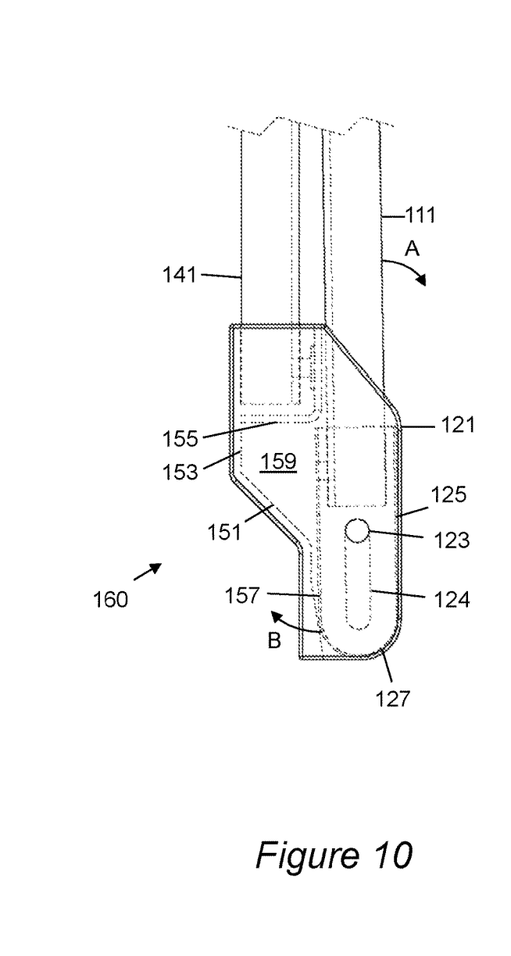
FIG. 10 is a side view of the pivot end of the stand device as it would appear in the stored position.

FIG. 10 is a side view of the pivot end 120 of the stand device 100 as it would appear in the stored position. The housing 121, pin 123, and endpiece 125 may be collectively referred to as a pivot structure 160. In this embodiment, handle support 141 is intended to be secured to the handle 5 of a hand implement 3, which may be the leaf rake shown in FIGS. 1A and 1B. Leg bar 111 and endpiece 125 falls downward until pin 123 reaches the end of slot 124. If one tries to rotate leg bar 111 outward from its current position, it causes the portion of endpiece 125 below pin 123 to rotate in a direction indicated by the arrow "B". The surface of endpiece 125 comes in contact with an inner surface 157 of the lower portion of endpiece 125, stopping rotation of leg bar 111.

Figure 11:
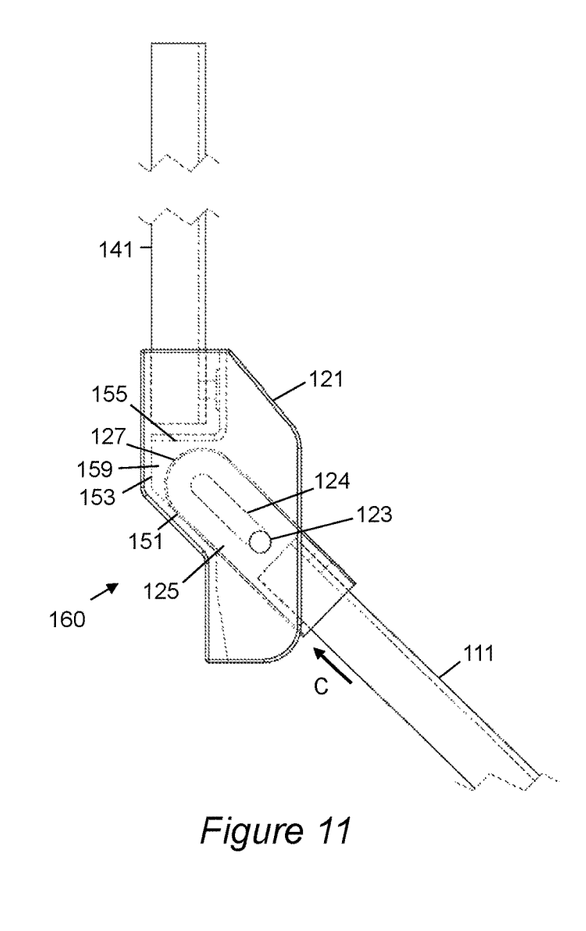
FIG. 11 is a side view of the pivot end of the stand device of FIGS. 1-11 as it would appear in the locked position with the leg bar extended in the locked position.

FIG. 11 is a side view of the pivot end 120 of the stand device 100 of FIGS. 1-11 as it would appear in the locked position with the leg bar 111 extended. In this embodiment, the leg bar 111 has been lifted upward from its position shown in FIG. 10. It is then rotated to the angle show in FIG. 11. Leg bar 111 is then pushed along the direction marked "c" into the housing 121 and into a recess 159. This causes endpiece 125 to move causing pin 123 to move to the end of slot 124. Curved end 127 of endpiece 125 then enters recess 159 and becomes lodged between side surface 153 and top surface 155 securing endpiece 125 and leg bar 111 to become locked in a predetermined position and angle.

Alternative Embodiment

Figure 12:
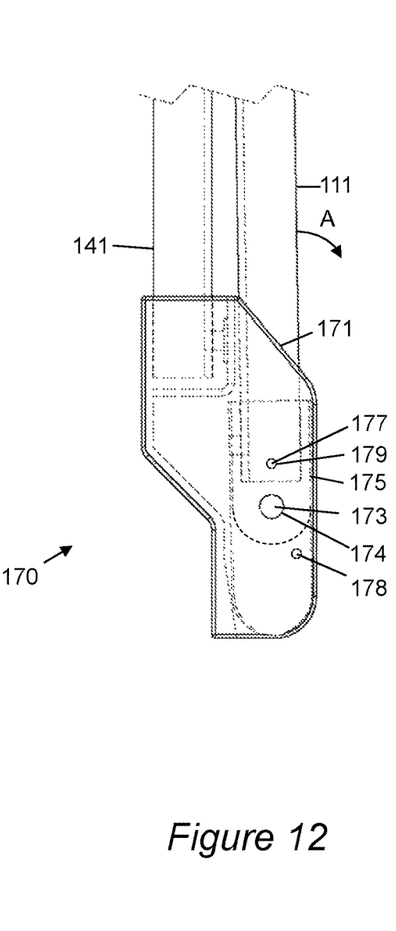
FIG. 12 shows an alternative embodiment of a locking pivot structure according to the current invention in its stored position.
Figure 13:
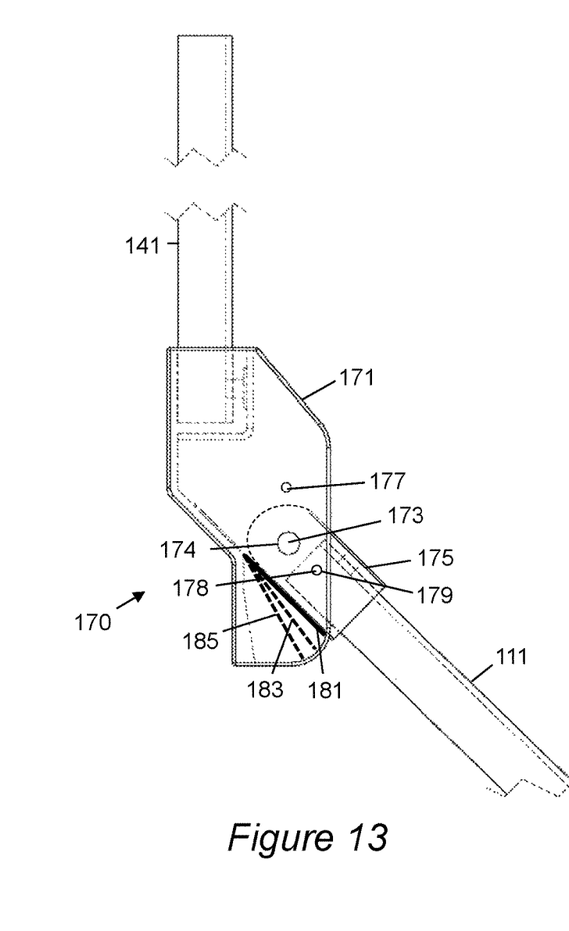
FIG. 13 shows an alternative embodiment of a locking pivot structure according to the current invention in its position holding the hand implement upright.

An alternative embodiment of a locking pivot structure 170 according to the current invention is shown in FIGS. 12 and 13.

FIG. 12 shows an alternative embodiment of a locking pivot structure 170 according to the current invention in its stored position. In the stored position leg bar 111 is upright and stored adjacent to the handle support 141. When in the stored position, a bump 177 on an inside surface of the housing 171, extends slightly into the area which receives endpiece 175. It has a height and width to allow endpiece to rotate in and out of this area, but causes some friction. There is a recess 179 on the outside surface of endpiece 175 which receives bump 177 such that they snap in place holding endpiece 175 in housing 171.

FIG. 13 shows an alternative embodiment of a locking pivot structure 170 according to the current invention in its position holding the hand implement upright, as shown in FIG. 1B.

Endpiece 175 has a round recess 174 which receives a pin 173. Endpiece 175 is allowed to rotate around the pin 173.

When moving leg bar 111 from its stored position to its use position, it pivots in the direction indicated by arrow "A" around pin 173. The force required to pull the leg bar 111 out of its storage position must be enough to pop bump 177 out of recess 179. Once out, leg bar 111 rotates to the position indicated in FIG. 13. A rotation stop 181 is positioned at an angle and fixed within the housing 171 to stop the rotation of leg 111. Since this device is intended to be used on different hand implements of different sizes and shapes, the leg angle is different for each of these. Therefore, rotation stop 181 is adjusted to one of several various positions, also shown as position 183 and 185 in FIG. 13 during a setup phase to allow position rotation stop 181 at the proper angle to stand the hand implement upright. Once the rotation stop 181 is positioned, it does not have to be repositioned for this hand implement.

Optionally, one or more additional bumps 178 can be implemented on the inside surface of housing 171 at the lower portion. Each of these bumps 178 may be used to lock the endpiece 175 so that it does not easily rotate back upward. These bumps must be coordinated with the locations of the rotation stops 181, 183 or 185.

In another alternative embodiment of the current invention, one or more additional bumps 178 may be used in place of the rotation stops 181 183 and 185.

In still another an alternative embodiment, the bump 177 can be on the endpiece or leg bar 111 with the recess 179 being on the housing 171.

In alternative embodiments, different shapes for the bump 177 and recess 179 can be used, as long as they mate together. Snaps, clips, fasteners and other temporary attachment devices may also be used.

Since other modifications and changes varied to fit particular operating requirements and environments will be apparent to those skilled in the art, the invention is not considered limited to the example chosen for the purposes of disclosure, and covers changes and modifications which do not constitute departures from the true spirit and scope of this invention.

What is claimed is:

1. A stand device adapted to attach to a hand implement and stand the hand implement upright comprising:
   a. a securing structure secured to a handle of said hand implement;
   b. a leg capable of being folded up and flat against the handle in a stored position, and folded down into a usable position to steady the hand implement and hold the hand implement in an upright position; and
   c. a pivot structure for attaching to the securing structure and the leg allowing the leg to pivot with respect to the securing structure into an angled position thereby supporting the hand implement in the upright position, the pivot structure comprising:
  i. a housing having an angled recess;
  ii. an endpiece sized and shaped to fit into and be retained by recess, the endpiece having an elongated slot;
  iii. a pin within elongated slot fixed to the housing allowing the endpiece to rotate and translate to lock within recess at a predetermined angle.

2. The stand device of claim 1 wherein the securing structure comprises:
  a. an elongated handle support for resting against the handle and for providing support to the stand device, and
  b. a clamp designed to secure the handle support to the handle of the hand implement.

3. A stand device adapted to attach to a hand implement and stand the hand implement upright comprising:
  a. a securing structure secured to a handle of said hand implement;
  b. a leg capable of being folded down to steady the hand implement and hold the hand implement in an upright position; and
  c. a pivot structure for attaching to the securing structure and the leg allowing the leg to pivot with respect to the securing structure into an angled position thereby supporting the hand implement in the upright position;
  d. wherein the pivot structure comprises:
    i. a housing having an angled recess;
    ii. an endpiece sized and shaped to fit into and be retained by recess, the endpiece having an elongated slot; and
    iii. a pin within elongated slot fixed to the housing allowing the endpiece to rotate and translate to lock within recess at a predetermined angle.

4. The stand device of claim 1 wherein the pivot structure comprises:
  a. a housing;
  b. an endpiece having a round recess;
  c. a pin within the round recess fixed to the housing allowing the endpiece to rotate around it; and
  d. a rotation stop which may be adjustably positioned within the housing to stop rotation of the endpiece at a desired rotation angle.

5. The stand device of claim 1 wherein the hand implement comprises:
  a garden implement.

6. The stand device of claim 1 wherein the hand implement comprises:
  one of the group consisting of: a rake, shovel, and hoe.

7. The stand device of claim 1 further comprising:
  a foot attached to the end of the leg, the foot having a widened end for adding stability and for preventing it from sinking in soft soil.

* * * * *